Dec. 29, 1931.　　　J. M. BOURLAND　　　1,838,248
AIRSHIP
Filed June 21, 1930　　2 Sheets-Sheet 1

INVENTOR.
JOSEPH MILES BOURLAND
BY Munn & Co.
ATTORNEYS.

Dec. 29, 1931.     J. M. BOURLAND     1,838,248
AIRSHIP
Filed June 21, 1930     2 Sheets-Sheet 2

INVENTOR.
JOSEPH MILES BOURLAND
BY Munn & Co.
ATTORNEYS.

Patented Dec. 29, 1931

1,838,248

UNITED STATES PATENT OFFICE

JOSEPH M. BOURLAND, OF RICHMOND, CALIFORNIA

AIRSHIP

Application filed June 21, 1930. Serial No. 462,876.

My invention relates to improvements in airships, and it consists in the combinations, constructions and arrangements hereinafter described and claimed.

An object of my invention is to provide an airship employing a rigid balloon either filled with a lifting gas or under partial vacuum, this balloon being buoyant enough to counterbalance the weight of the balloon itself and the fuselage supported by the balloon. I provide wings on the balloon, which is preferably spherical in form, and I rotate the balloon for causing these wings to lift the balloon and with it the fuselage. The speed of rotation of the balloon may be varied at will for supporting the load and for lifting the entire device vertically or for gently lowering the device onto the ground. The fuselage is provided with one or more propellers giving a line of direction to the device while in the air. Furthermore, the rigid balloon is provided with fins that extend from the top to the bottom, and these fins are used for propelling the device through the air when the rigid balloon is rotated. The device combines the principle of the dirigible, rigid balloon, and the airplane, producing a new type of aircraft that takes advantage of practically all of the best features of the three devices just mentioned. The device can be applied to many forms of aircraft, to enable them to take off and to land without any runways, or airports, as now constructed.

Other objects and advantages will appear as the specification proceeds, and the novel features of the device will be particularly pointed out in the claims hereto annexed.

My invention is illustrated in the accompanying drawings, in which.

Figure 1:
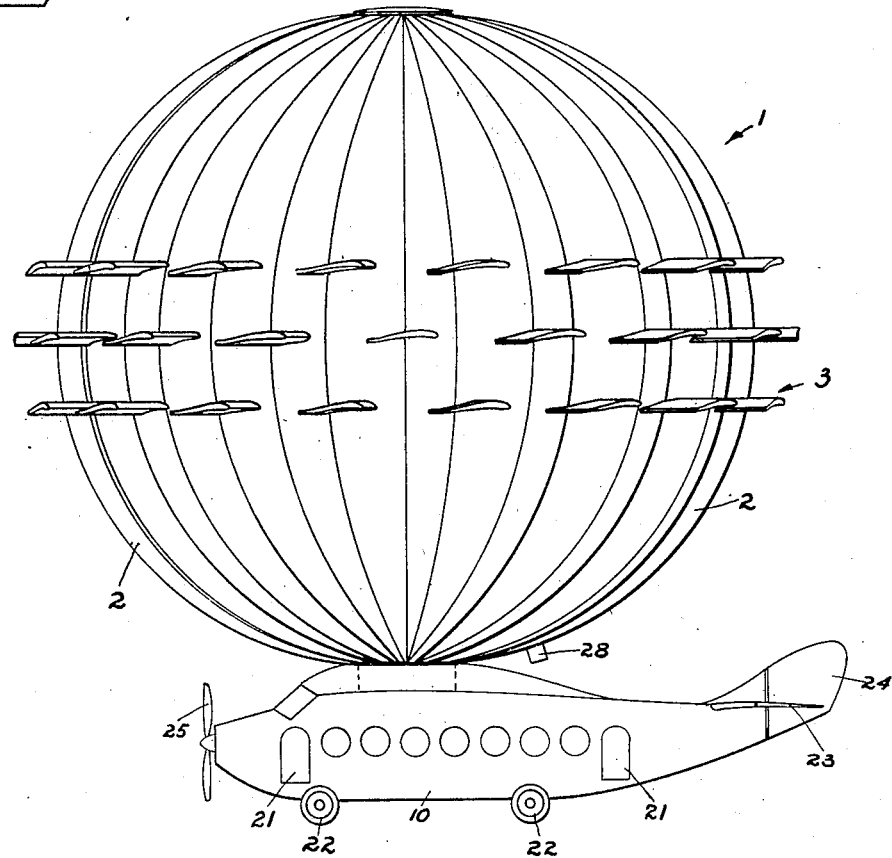
Figure 1 is a side elevation of the device.
Figure 4:
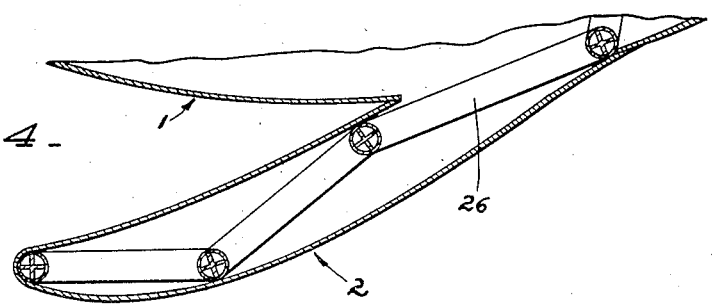
Figure 4 is a structural detail of one of the balloon fins.
Figure 2:
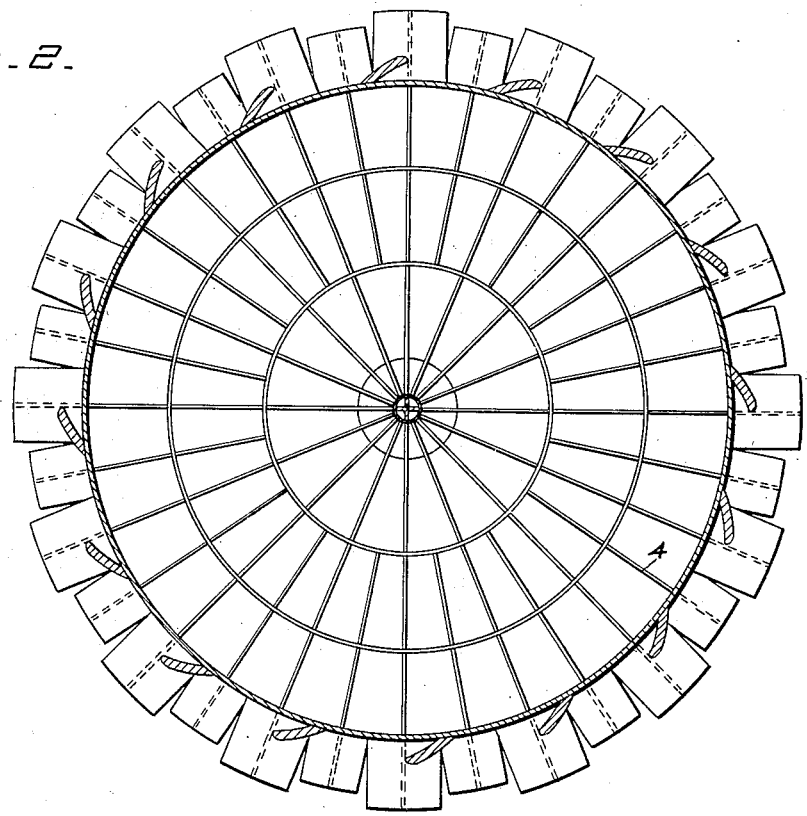
Figure 2 is a horizontal section through the balloon.

In carrying out my invention, I provide a spherical balloon indicated generally at 1 which is preferably rigid in construction and made entirely of metal. The balloon is provided with cambered fins 2 as shown in Figures 1, 2 and 4, these fins extending in circles from pole to pole of the balloon. The balloon is further provided with all-metal airplane wings 3 (see Figures 1, 2 and 5), and these wings project radially from the balloon and are disposed in circles paralleling the equatorial circle of the balloon. When more than one circle of wings are used, the wings in adjacent circles are staggered with respect to each other. It should be noted that the circle of wings 3 crosses the circle of fins 2 substantially at right angles.

Figure 3:
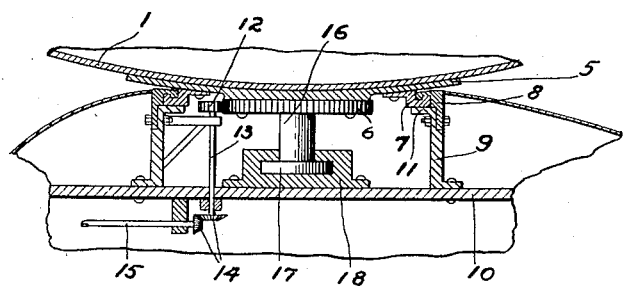
Figure 3 is a longitudinal section through a part of the device.

The globe or balloon 1 is hollow except for the reinforcing structure indicated generally by the reference numeral 4 in Figure 2. It is obvious that this structure may be changed without departing from the spirit and scope of the invention. Referring to Figure 3, it will be noted that the bottom of the balloon 1 has a member 5 which carries a gear 6 and a flange 7. The flange 7 rides in a flange 8 carried by a cylindrical member 9, this member being secured to a fuselage 10. The cylindrical member 9 has an integral flange 11, and this cooperates with the removable flange 8 for holding the flange 7 in position yet permitting the rotation of this flange.

The means for rotating the balloon 1 comprises a pinion 12 that meshes with the gear 6. The pinion 12 is connected by a shaft 13 and bevel gears 14 to a drive shaft 15, the latter being connected to a power source not shown. A stub shaft 16 projects below the gear 6, and this shaft has a flanged end 17 that is received in a retaining member 18, the latter being secured to the fuselage 10. It is obvious that this type of mounting can be changed at will without departing from the spirit and scope of my invention. The principal point is to provide some source of power for rotating the balloon 1 with respect to the fuselage 10.

Figure 6:
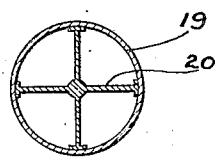
Figure 6 illustrates the type of reinforcing used in the device.

The framework 4 will preferably consist of tubular members 19 (see Figure 6), these members having reinforcing diametrically-extending ribs 20 that may be secured to the tubing 19 in any manner desired. The tubing 19 is preferably of a light metal or alloy, and the air is preferably exhausted from the tube and the ends of the tube are hermetically sealed after the exhausting of the air.

I have shown a more or less standard type of fuselage 10 having entrance and exit doors 21, landing wheels 22, elevators 23, a rudder 24, and a propeller 25. All of these parts may be changed at will in order to adapt the device for the particular type of work to be done. The invention relates to an improved method of application and operation of a rigid balloon, having airplane wings and fins, to practically any form of aircraft, enabling the craft to rise vertically when taking off and to descend vertically in landing. The device will also maintain any desired altitude in flight.

Figure 5:
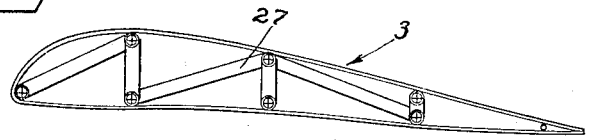
Figure 5 is a structural detail of one of the balloon wings.

In Figure 4 I have shown the fin 2 as being braced as at 26 so as to withstand stresses under flying conditions, and in like manner in Figure 5 I have shown the wing 3 as being provided with reinforced bracing 27 for a similar purpose. It is my intention to either fill the balloon 1 with a lifting gas such as helium, using gas bags if desired, or to pump the air from the balloon and to create a sufficient vacuum to counterbalance the weight of the balloon itself and the weight of the aircraft when empty. The wing area is sufficient to lift approximately three times the total load of the device when loaded.

The object of the cambered fins 2 is to assist in the rotation of the balloon 1, because the device in moving through the air will assist the balloon 1 to rotate due to the fins, and the wings 3, being placed at the largest diameters of the balloon, will travel at a great speed and will exert a lifting force. The leading edges of the wings 3 face in the same direction as the rotation of the balloon.

The device requires but a few men to operate it, and it does not need a mooring mast, as is true with dirigibles, nor runways for taking off and landing, as is true with airplanes. At the same time, the propeller 25 governs the direction taken by the device and prevents it from floating away with the wind as is true with a standard balloon. Should the power plant suddenly stop functioning, the dropping of the device through the air will cause the rigid balloon 1 to rapidly revolve, and the wings 3 will break the fall so as to provide a safe landing. A valve indicated generally at 28 in Figure 1, is used for admitting gas to the interior of the balloon or for exhausting air from the balloon.

From the foregoing description of the various parts of the device, the operation thereof may be readily understood.

Under actual flying conditions, the engine (not shown) is started and is connected to the balloon so as to rotate it slowly. When all is ready, the rotation of the balloon is speeded up and the wings 3 will lift the aircraft vertically to the desired height. At this point the propeller 25 can be started and the device will move forwardly through the air. The speed of rotation of the balloon can be reduced so as to maintain the desired altitude. If the device loses altitude, it is only necessary to increase the speed of the balloon 1, and the opposite is true when the device rises too high.

When landing the device, it is wise to face it into the wind and then stop the propeller 25. The speed of the balloon 1 is slowed down so as to permit it to come gently down to earth. When near the earth, the speed of the balloon should be increased so as to have this practically offset the weight of the entire device. In this way the landing can very likely be made with no resulting jar. Should the wind be blowing enough to cause the device to drift along the ground, the propeller 25 can be started to offset this.

The maneuvering of the aircraft can be accomplished from the fuselage 10 in the same manner as an airplane.

It should be noted that the invention can be applied to practically any type of airplane, whether the airplane makes use of wings on the fuselage or not. If the rigid balloon is made small enough in form, it can be used in much the same manner as a helicopter with a greater factor of safety. The device when used will either eliminate or shorten, as the case may be, the run formerly required to get an airship into the air or to land it. The wind drag and lift drag ratio will be lessened. It should also be noted that tail spins and many other forms of accidents are prevented. In case of engine failure, a greater climbing radius is provided, and the fall will not be as rapid as in airships not using the device.

Although I have shown and described one embodiment of my invention, it is to be understood that the same is susceptible of various changes, and I reserve the right to employ such changes as may come within the scope of the claims hereto annexed.

I claim:

1. An airship comprising a fuselage, a rigid, spherical shaped balloon disposed above and connected to the fuselage at the center of gravity, wings carried by said balloon, means for rotating the balloon for causing the wings to lift the entire device, and fins extending from pole to pole of the balloon and being of greatest depth midway between the poles and gradually tapering off to the poles, the fins being inclined for rotating the balloon to advance the leading edges of the wings.

2. An airship comprising a fuselage, a rigid, spherical shaped balloon disposed above and connected to the fuselage at the center of gravity, wings carried by said balloon, and means for rotating the balloon for causing the wings to lift the entire device, said wings being disposed in circles about the balloon, the wings of one circle being staggered with respect to the wings of the adjacent circles.

3. An airship comprising a fuselage, a rigid, spherical shaped balloon disposed above and connected to the fuselage at the center of gravity, wings carried by said balloon, means for rotating the balloon for causing the wings to lift the entire device, and fins extending from pole to pole of the balloon and being of greatest depth midway between the poles and gradually tapering off to the poles, the fins being inclined for rotating the balloon to advance the leading edges of the wings, said wings being disposed in circles about the balloon, the wings of one circle being staggered with respect to the wings of the adjacent circles.

4. An airship having a rigid spherical-shaped balloon, reinforcing tubing for the balloon, said tubing having its ends sealed and being exhausted of air, and reinforcing ribs disposed within the tubing.

5. An airship comprising a fuselage, a rigid, spherical-shaped buoyant balloon disposed above and connected to the fuselage at the center of gravity, wings carried by said balloon, and means for rotating the balloon for causing the wings to lift the entire device and fins extending from the balloon for aiding in propelling it through the air.

6. An airship comprising a fuselage, a rigid, spherical-shaped buoyant balloon disposed above and connected to the fuselage at the center of gravity, wings carried by said balloon, and means for rotating the balloon for causing the wings to lift the entire device and fins extending from the balloon for aiding in propelling it through the air, said fins extending from pole to pole of the balloon.

7. An airship comprising a fuselage, a rigid, spherical-shaped buoyant balloon disposed above and connected to the fuselage at the center of gravity, wings carried by said balloon, and means for rotating the balloon for causing the wings to lift the entire device and fins extending from the balloon for aiding in propelling it through the air, said fins extending from pole to pole of the balloon and being of greatest depth midway between the poles and gradually tapering off to the poles.

8. An airship comprising a fuselage, a rigid, spherical-shaped balloon rotatably connected to the fuselage, fins carried by the balloon, and means for rotating the balloon for causing the fins to propel the fuselage forwardly.

9. An airship comprising a fuselage, a rigid, spherical-shaped balloon connected to the fuselage, and fins extending from pole to pole of the balloon and being of greatest depth midway between the poles and gradually tapering off to the poles, the fins being inclined to rotate the balloon as the airship is propelled forwardly.

Signed at Richmond, in the county of Contra Costa and State of California this 11th day of June, 1930.

JOSEPH M. BOURLAND.